Dec. 11, 1956 E. WILDHABER 2,773,429
MACHINE AND METHOD FOR GENERATING TAPERED GEARS
Filed July 12, 1952 4 Sheets-Sheet 1

INVENTOR.
ERNEST WILDHABER
BY Richard W. Treverton
ATTORNEY

Dec. 11, 1956     E. WILDHABER     2,773,429
MACHINE AND METHOD FOR GENERATING TAPERED GEARS
Filed July 12, 1952     4 Sheets-Sheet 2

*INVENTOR.*
ERNEST WILDHABER
BY
Richard W. Treverton
*ATTORNEY*

Dec. 11, 1956  E. WILDHABER  2,773,429
MACHINE AND METHOD FOR GENERATING TAPERED GEARS
Filed July 12, 1952  4 Sheets-Sheet 3

INVENTOR.
ERNEST WILDHABER
BY
Richard W. Treverton
ATTORNEY

Dec. 11, 1956 E. WILDHABER 2,773,429
MACHINE AND METHOD FOR GENERATING TAPERED GEARS
Filed July 12, 1952 4 Sheets-Sheet 4

INVENTOR.
ERNEST WILDHABER
BY
Richard W. Treverton
ATTORNEY

United States Patent Office 2,773,429
Patented Dec. 11, 1956

2,773,429

MACHINE AND METHOD FOR GENERATING TAPERED GEARS

Ernest Wildhaber, Brighton, N. Y., assignor to The Gleason Works, Rochester, N. Y., a corporation of New York Application July 12, 1952, Serial No. 298,544

19 Claims. (Cl. 90—5)

The present invention relates to a machine and method for producing spiral bevel and hypoid gears by a generating process with either a circular face mill cutter, a face hob or a tapered hob.

A conventional way of producing such gears is to cut the gear, or larger member of the pair, by a generating process in which there are relative motions of the work and the cutter respectively about the axis of the work and the axis of an imaginary gear represented by the cutter, with the rotations about the two axes in constant velocity ratio to each other. Usually both sides of the teeth are cut in the same operation. The pinion, or smaller member of the pair, is produced by a similar process, except that, for the purpose of modifying the tooth bearing, the ratio of roll, i. e. the ratio of the rotations about the work axis and the imaginary gear axis, are varied as the generation proceeds. Usually this change in ratio of roll, commonly called modified roll, must be in opposite directions for cutting the opposite sides of the teeth. That is the ratio of roll is increased during the generation of one side of the teeth and decreased during the generation of the opposite side of the teeth, and this has heretofore required that the cutting of the opposite sides of the teeth be in two separate operations. The principles underlying the use of modified roll in gear tooth generation are disclosed in my Patent No. 2,310,484, granted February 9, 1943. The method as there disclosed is useful not only for producing gears capable of transmitting uniform motion when running with mate gears produced by a non-generating or form cutting method, but also, as discussed above, for effecting desired changes in tooth bearing, such as localizing the tooth bearing by slightly increasing the profile or longitudinal curvature of the teeth, correcting bias or diagonal tooth bearing, and correcting a tooth bearing that is higher on one face of the tooth than on the opposite face, commonly known as lameness.

The present invention provides a machine and method whereby an effect similar to modified roll is obtained while maintaining a constant ratio of roll. The invention provides the additional advantage, however, that the effect achieved is in the same direction on both sids of the teeth so that both sides may be cut in the same operation. Thus while the invention is applicable in principle to generation of gears both with a circular face mill cutter and with a hob of either the face or tapered type, just as is the method disclosed in my aforementioned Patent No. 2,310,484, it is particularly advantageous to generation with hobbing tools where it is customary to cut both sides of the teeth in a single operation.

According to the invention the cutter is moved a slight amount relative to the work, in a direction depthwise of the teeth being cut, as the tooth surface generation proceeds toward approximately its mid-point, and then is moved in the opposite direction a similar amount as the tooth surface generation continues beyond said point. Ordinarily the motion is a withdrawal of the cutter relative to the work as the generation proceeds to the mid-point, and then an advance during the continuation of the generation, and preferably the motion is in the direction of the axis of the imaginary gear which the cutter represents in the generating process. In the case of a circular face mill or face hob cutter this will ordinarily be in the direction of the cutter axis.

The machine comprises a work spindle, a cutter spindle, a cradle on which one spindle is mounted, means for rotating the cutter spindle, means for rotating the cradle and in time therewith rotating the work spindle to thereby cause the rotating cutter to effect tooth profile generation, and means for oscillating one spindle relative to the other, in a direction depthwise of the teeth being cut, in such timed relationship to rotation of the cradle that the cutter moves in one direction, usually withdraws, relatively to the work as the generation proceeds approximately to its mid-point and that the cutter moves in the opposite direction, usually advances, relatively to the work as the generation proceeds beyond said point. The axis about which the cradle rotates is, of course, the same as the axis of the imaginary gear. Where the cutter is intended to cut opposite sides of the teeth in one operation it of course has opposite side cutting surfaces which are oppositely inclined to each other in a plane axial of the cutter.

The means for oscillating one spindle relative to the other may comprise bearing means mounting the cutter spindle in the cradle for both rotation and axial motion, a helical cam member and a cam follower member rotatable on the cradle co-axially of the cutter spindle, one member being held against axial motion relative to the cradle and the other member against axial motion relative to the spindle, and a means for oscillating said one member as the cradle turns. The last named means may comprise an arm on the member that is to be oscillated, which arm has a slot extending radially of the cutter spindle axis. A roller engaged in the slot, and itself supported by a stationary portion of the machine, causes the arm to rock relative to the cradle as the latter turns during tooth surface generation.

The roller is adjustable on its stationary support in a direction radial of the cradle axis, to thereby vary the amplitude of oscillation of said one member. This adjustment therefore constitutes a means for adjusting the amplitude of oscillation of the cutter spindle axially in the cradle. The roller is also adjustable on its stationary support about the cradle axis, to thereby vary the plane of tooth surface generation at which the reversal point of the oscillation occurs.

Referring now to the accompanying drawings.

Figure 1:
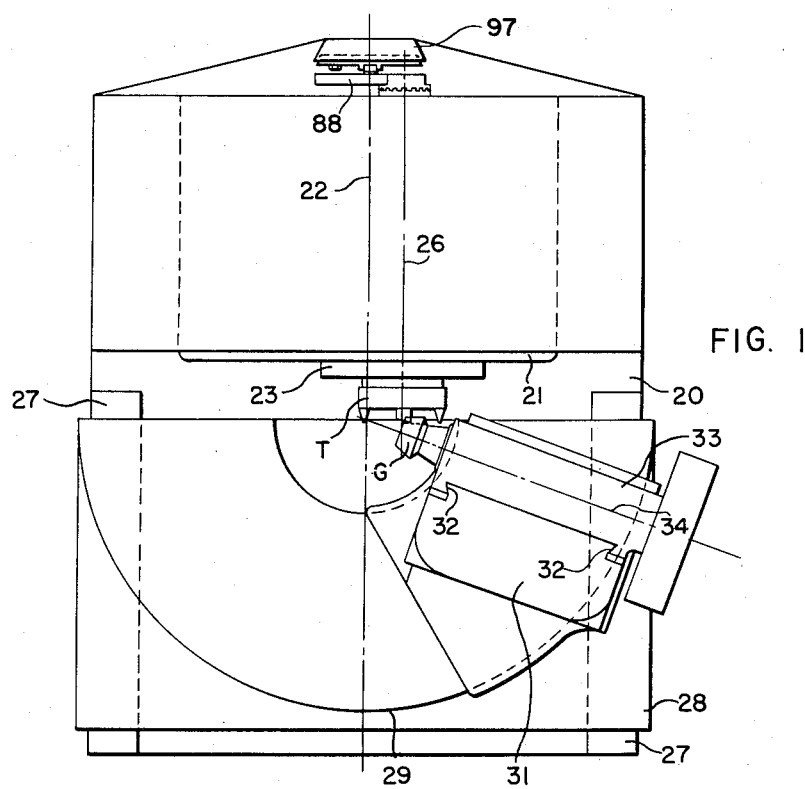
Fig. 1 is a plan view of the machine employing either a circular face mill cutter or face hob.

As shown in Fig. 1 the machine may comprise a base 20 upon which a cradle 21 is mounted for rotation about its axis 22 in both directions, or at least for oscillation through a substantial angle. Mounted for adjustment on the cradle is a support 23 in which a cutter spindle 24 is journaled on anti-friction or roller bearings 25 (Fig. 2) for rotation about its axis 26 and also for axial oscillation of small amplitude (on the order of approximately one to a hundred one-thousandths of an inch). The adjustment of the support 23 on the cradle is such that the axis 26 may be positioned at different radial distances from the cradle axis 22. The rotary tool designated T may be either a circular face mill cutter or face hob. Movable in the direction of axis 22 along ways 27 on the base is a slide 28 having an arcuate guideway 29. A column 31 is angularly adjustable on slide 28, being guided for such adjustment by the guideway 29. The column has vertical ways 32 along which a work spindle support 33 is adjustable. The work or gear blank to be cut, designated G, is mounted on the work spindle whose axis is shown at 34. The adjustments described enable the work G to be brought into proper relation to the cutter T for the tooth surface generating operation. During such generation the work G rotates about its axis 34 in constant velocity ratio with rotation of the cradle 21 about axis 22. In this action surfaces swept by the cutting edges of the cutter T represent a tooth of an imaginary gear whose axis is the cradle axis 22, the work gear G rotating in mesh with the imaginary gear. In order to install or remove the gear G from the work spindle the latter is moved away from the cutter by moving out the slide 28 along ways 27.

Figure 6:
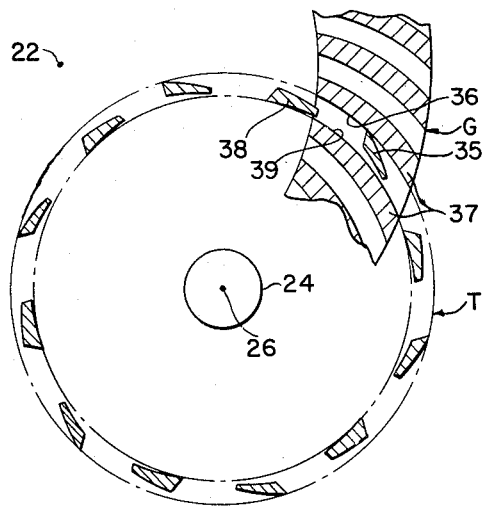
Fig. 6 is a sectional view through a circular face mill cutter and the work in a plane perpendicular to the cutter axis.

The tool T if a circular face mill cutter may as shown in Fig. 6 have outside blades 35 for cutting the concave surfaces 36 of the teeth 37 of gear G, and inside blades 38 for cutting the convex surfaces 39 of the teeth, all of the outside blades being arranged in a circle concentric of the cutter axis, and all of the inside cutting blades being arranged in another concentric circle, so that all of the blades operate simultaneously in the same tooth space. With this kind of cutter, after one pair of tooth surfaces 36, 39 have been generated the work G is indexed about its axis to bring a succeeding tooth space into cutting position before the generating operation is repeated, there being one complete generating operation for each tooth space of the gear.

Figure 7:
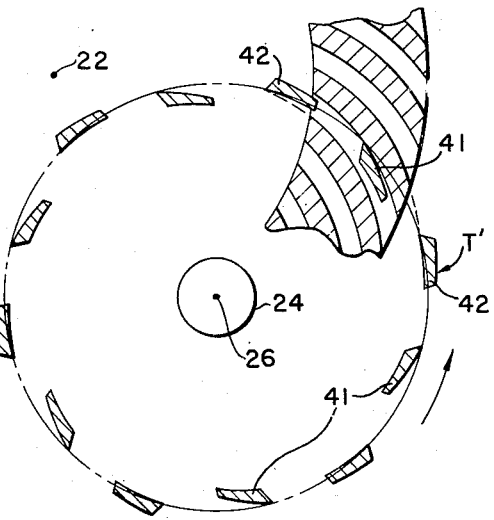
Fig. 7 is a view similar to Fig. 6 but showing a face hob instead of a circular cutter.

When the cutter is a face hob it may be like the cutter T' shown in Fig. 7 having a plurality of pairs of outside cutting blades 41 and inside cutting blades 42, the blades of each successive pair being adapted to operate in a successive tooth space of the work gear G. While all of the outside blades are at the same radial distance from the cutter axis, each of them may be considered to lie along a different spiral about the cutter axis, all of the spirals having the same lead. The same is true of the inside cutting blades. The cutter and the work rotate continuously so that no intermittent indexing of the work is required, and all of the tooth surfaces are cut in one generating motion of the cradle.

Figure 8:
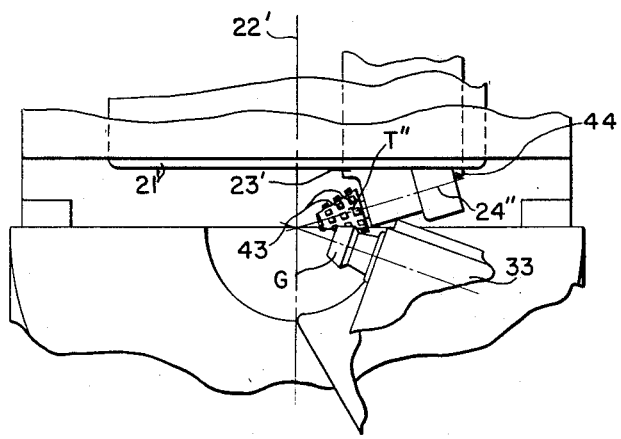
Fig. 8 is a fragmentary plan view showing the relation of the cutter to the work in a machine employing a tapered hob.

Or the cutter may be a tapered hob T" as shown in Fig. 8, having its cutting teeth 43 arranged along a tapered helix, each tooth having both inside and outside cutting edges. In this case the axis 24" of the cutter spindle is inclined to the axis 22' of the cradle 21'. Instead of the cutter spindle being movable in the direction of its axis 24" as the spindle 24 is movable along axis 26 in support 23, the spindle for hob T" is journaled only for rotation in a slide support 44, and this support is movable in the direction of cradle axis 22' in a member 23' which corresponds to support 23 of Fig. 2. By adjustment of this member 23' in the cradle the cutter T" may be set at whatever radial distance from the cradle axis is required.

Figure 9:
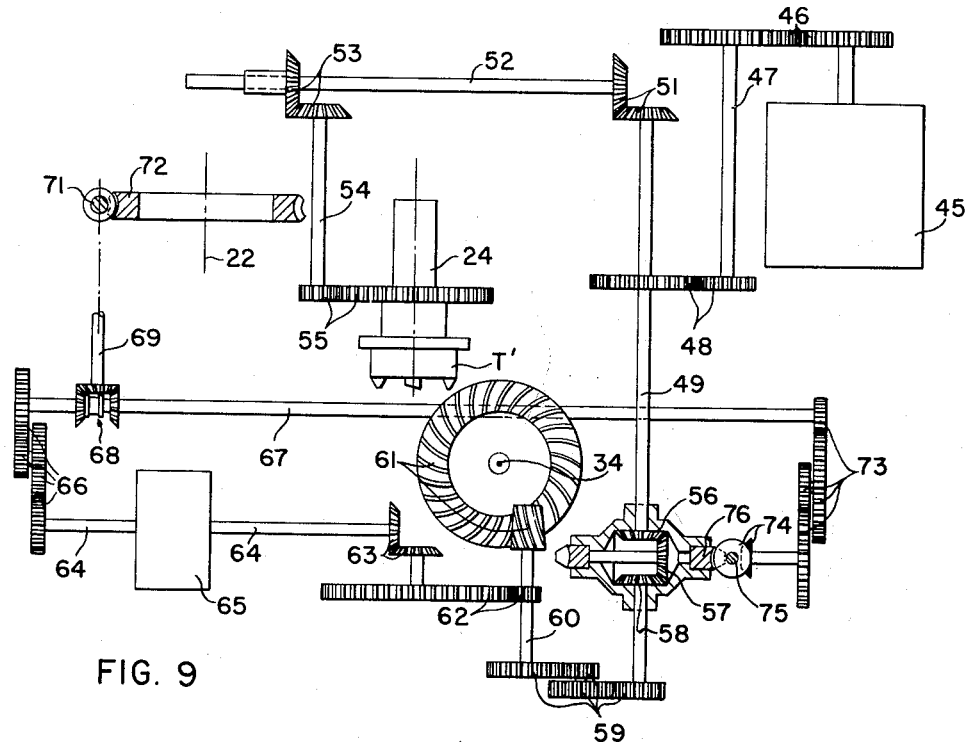
Fig. 9 is a schematic drive diagram of the machine shown in Fig. 1 when employing a face hob.

The drive of the machine may be conventional. For example the drive for the machine shown in Fig. 1 when the face hob cutter is employed, may be as shown in Fig. 9. This includes a reversible electric motor 45 which through change gears 46, shaft 47 and gears 48 drives a main shaft 49. From the latter the cutter T' is driven by means of bevel gears 51, shaft 52, bevel gears 53, shaft 54 and reduction gears 55 of which the driven member is secured to the cutter spindle 24. The work G is also driven from the main shaft 49, through gears 56, 57 and 58 of a differential gear unit, ratio change gears 59, shaft 60 and hypoid reduction gears 61 of which the driven member is affixed to the work spindle whose axis is designated 34. The drive arrangements described will be seen to impart to the work spindle a component of rotation in such timed relationship to rotation of the cutter T' that the successive pairs of blades of the latter will operate in successive tooth spaces of the work.

The cradle is also driven from the main shaft 49, via shaft 60, reduction gears 62, bevel gears 63, aligned shafts 64 between which a gear reduction unit 65 is arranged, change gears 66, shaft 67, reversing bevel gear set 68, shaft 69, worm 71, and worm gear 72 on the cradle 21. The gear set 68 is reversible, by shifting a clutch splined to shaft 67 so that it meshes with and drives one or other of the adjacent side gears. Reversal of the gear set 68 effects reversing of cradle rotation relative to the direction of cutter rotation.

For imparting to the work spindle a component of rotation proportional to the cradle rotation, the housing in which differential planet gear 57 is journaled is driven from shaft 67, through ratio change gears 73, bevel gears 74, worm 75, and wormwheel 76 on the housing. The relative directions of rotation of shaft 67 and wormwheel 76 may be reversed by inserting an additional idler gear in the change gears 73. Similarly the relative direction of rotation of the work spindle and the cutter spindle may be reversed by inserting an additional idler gear in the change gears 59.

In operation of the machine the gear G is cut during rotation or roll of the cradle in one direction. After the cutting is completed the slide 28 is withdrawn and the cradle could be returned by reversal of the drive motor 45. However it is customary to disconnect the cradle drive, as for example by disengaging the clutch of unit 68 from both side gears, and to then return the cradle by a separate power drive, not shown.

The drive for the tapered hob machine shown in Fig. 8, may be essentially the same, except for the extra gearing necessary to impart the motion from shaft 54 to the angularly related cutter spindle whose axis has been designated 24". Also the drive from the machine of Fig. 1, when employing a circular face mill cutter, may be essentially the same as shown in Fig. 9, except that since there is no need to operate the cutter in timed relation to work or cradle rotation, the differential gears 56, 57 and 58 and the drive gearing 73—76 are therefore omitted, the change gears 59 being driven directly from shaft 49. Also an automatically operated intermittent indexing mechanism is provided in the drive between shaft 60 and the work spindle to advance the work by one or more tooth spaces during each return motion of the cradle, the slide 28 being automatically withdrawn to retract the work from the cutter during such cradle return and work indexing. Also instead of reversing the drive train by means of reversal of drive motor 45, a separate reversing mechanism placed between the main drive shaft and the shaft 60 is conventionally employed for this purpose since there is no need to reverse the cutter drive.

Figure 2:
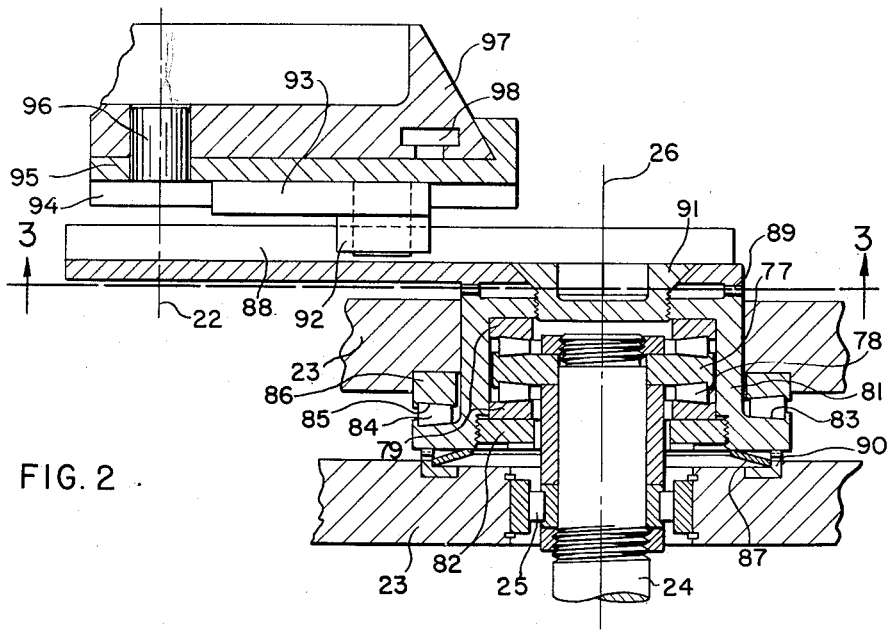
Fig. 2 is a fragmentary sectional view in planes that respectively contain the cutter spindle axis and the cradle axis.

Referring now to Fig. 2, there is secured to the spindle 24 an inner annular thrust bearing race 77 separated by tapered rollers 78 from outer annular bearing races 79, the rollers being held in a suitable cage, not shown. The latter are secured within a cup-shaped bearing member 81 by a screw threaded retainer ring 82. The bearing member 81 is arranged for helical motion in the support 23, and to this end has a helicoidal surface 83 spaced by tapered rollers 84 from a helicoidal surface 85 of the same lead provided on a bearing race 86 that is secured to the support 23. The rollers 84 are held by a suitable cage, not shown. Both of the helicoidal surfaces 83 and 85 are concentric with the axis 26. An annular thrust spring 87 acts between member 81 and support 23 to provide a compressive force on rollers 84 in any position of angular motion of member 81 relative to support 23 about axis 26. Such angular motion in opposite directions will, by reason of the helical surfaces and the thrust of spring 87, cause advance and withdrawal of the cutter spindle in the direction of its axis. It may be considered that one of the parts 81 and 86 is a helical cam and the other a cam follower. As shown the spring 87 is backed by a washer 90 which is rotatable in the member 23 and has clutch teeth meshing with similar clutch teeth on the bearing member 81 so that it oscillates with the latter about axis 26 and thereby prevents rotation of the spring relative to the parts that engage it. The depth of the clutch teeth is such that they remain in mesh without bottoming throughout the axial motion of the bearing member 81.

To produce such angular motion of member 81 a channeled arm member 88 is secured to its by means of circularly arranged interfitting clutch teeth 89 formed on the two parts and a screw 91 which clamps the parts together. Upon loosening of this screw the arm may be adjusted upon the member 81 about axis 26 to any of the angular positions relative thereto in which the teeth 89 will interengage.

Engaged in the channel of arm 88 is a roller 92 mounted on a stud carried by a block 93. This block is adjustable along a radial slot 94 in a member 95, being secured to the latter in any position of adjustment by suitable clamp means, not shown. Member 95 has a stud 96 journaled in a bracket 97 on the machine base 20. The stud is co-axial with the cradle so that member 95 may be adjusted angularly on it about the axis 22. Member 95 may be secured in any position of such adjustment by a clamp bolt, not shown, whose head engages in a T-slot 98 formed in member 97 concentric with axis 22.

Figure 3:
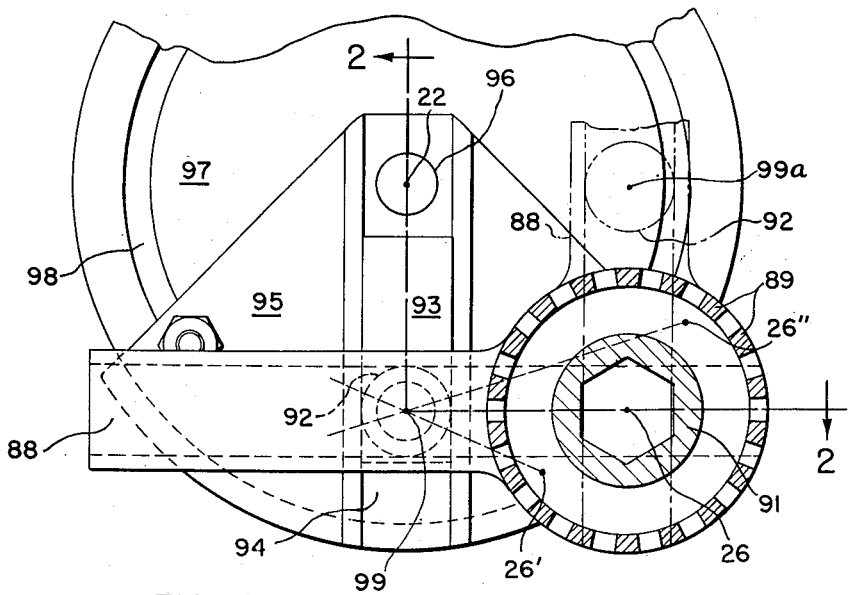
Fig. 3 is a view perpendicular to the cutter spindle axis and cradle axis further showing their relationship to parts appearing in Fig. 2.
Figure 4:
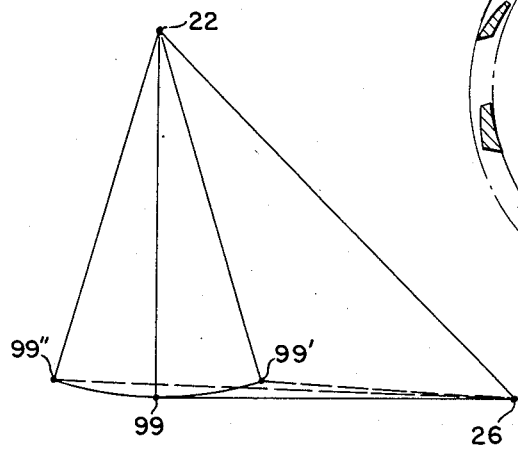
Figs. 4 and 5 are diagrams further showing the relationship of the parts shown in Figs. 2 and 3, and the effect of adjustment of them.
Figure 5:
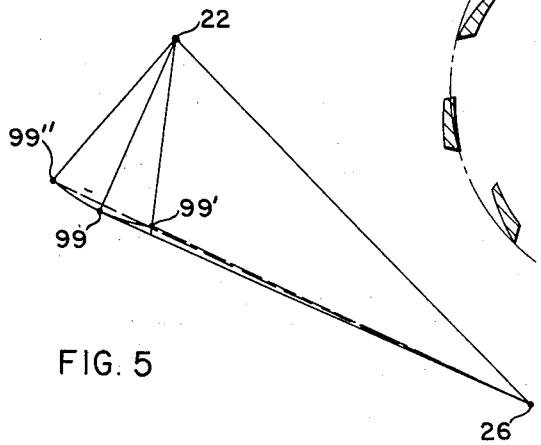

In Fig. 3 the center of the roller is designated 99. As the cradle swings about its axis 22 the channeled arm 88 will ride on the roller with the result that the arm and the bearing member 81 turn about axis 26 relative to the cradle. That is, as the cradle rotates about its axis 22, the angle 22—26—99 continuously changes. The nature of this change is perhaps more easily understood by considering the cradle to be stationary and the roller 92 to be rotated about the cradle axis. Thus instead of the cradle rotating counterclockwise to swing the cutter axis 26 from position 26' to position 26" in Fig. 3, it may be considered, as is illustrated in Figs. 4 and 5, that the axis 26 remains stationary and the roller axis 99 swings clockwise from position 99' to position 99". As the roller swings from position 99' to its mean position 99 (which may be considered to represent the mean point of the generating roll of the cradle), the arm 88, represented by line 99—26, swings counterclockwise about axis 26 through the angle 99'—26—99. As the roller swings from 99 to 99", the arm swings clockwise about axis 26 through the angle 99—26—99". This relative motion of the arm and the cradle of course is effective through the helical bearing 81, 84, 86 to withdraw the spindle 24 and the cutter along axis 26 from the work as the tooth surface generation proceeds toward its mid-point and to advance the spindle and cutter toward the work as the generation continues beyond such mid-point.

The amount of such withdraw and advance may be varied by adjusting the block 93 to different positions along radial slot 94, after first making a corresponding adjustment of the arm 88 about axis 26 relative to helical bearing member 81. For example by shortening the distance 99—22 to the extent shown in Fig. 5, while the radial distance 22—26 of the cutter axis from the cradle axis is kept the same, it will be seen that for the same angle 99'—22—99" of cradle roll, the angular motion of the arm 88 relative to the cradle, that is the angular motion represented by angle 99'—26—99 and angle 99—26—99", is decreased and of course the axial motion of the spindle 24 is proportionately reduced.

Substantially the same mechanism shown in Fig. 2 may be employed to withdraw and advance the support 44 (Fig. 8) in time with rotation of cradle 21'. In fact it may be considered for this purpose that the spindle 24 (Fig. 2) is a rod secured to slide 44.

Figure 10:
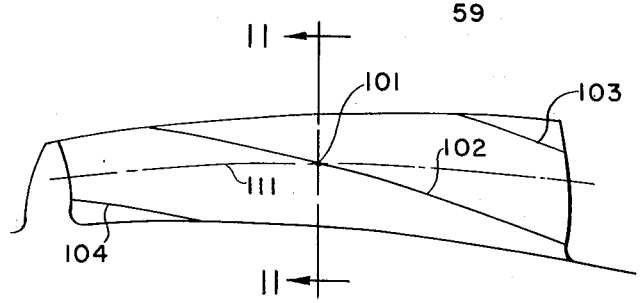
Fig. 10 is a face view of one tooth of a tapered gear.

The effect of the withdraw and advance motions of the cutter T, T' or T" in the direction of the cradle axis in time with cradle rotation will now be described. Referring to Fig. 10, point 101 is a mean point on the tooth surface, and line 102 which passes through it represents the cut of one blade of cutter T or T' across the surface when the cradle is at the center of its roll (when cutter axis 26 is in the position shown in Fig. 3). If the tapered hobbing cutter T" is employed then the line 102 represents the sum of the cuts of a number of successive hob teeth 43 across a tooth surface when the cradle is in this center position of its roll. Cuts such as those represented by lines 103 and 104, which are approximately parallel to line 102, will be made by the cutter when the cradle is near the ends of its tooth surface generating roll, wherein the cutter axis 26 is at 26' and 26" of Fig. 3.

Figure 11:
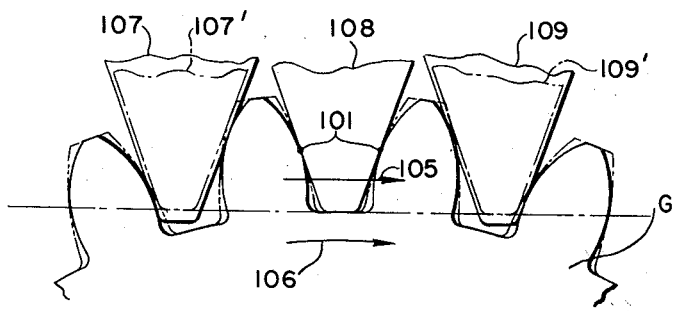
Fig. 11 is a diagram showing the relationship between the cutter and the gear being cut in various phases of the tooth surface generation, the diagram being approximately in the plane indicated at 11—11 in Fig. 10.

The effect of the withdraw and advance motion of the cutter timed with the cradle roll is to remove additional stock from the tooth on opposite sides of line 102, the amount of additional stock removed being approximately proportional to the square of the distance from line 102. In Fig. 11, the motion of the cradle is considered to be in the direction of arrow 105, this motion being in constant velocity ratio with rotation of the work gear G in direction 106 about its axis 34. With conventional generation the cutter blade shown would occupy the successive positions shown at 107', 108 and 109' and the side cutting edges of the tool would generate tooth profiles of the shape shown in broken lines on gear G. With the present invention the blade is at greater depth in positions 107 and 109 with the result that the more curved tooth profiles shown in full lines are generated. The effect is somewhat as though the right side cutting edge accelerated as it progressed from position 107' to position 109', and the left side cutting edge decelerated, while the rotation 106 remained constant. The longitudinal tooth curvature, along line 111 of Fig. 10 is also affected, since progressively more stock is removed at points along this line further removed from mean point 101.

Points along line 102 are the only portions of the tooth surface that are unaffected by the withdraw and advance motion of the cutter. This line may be shifted so that it will pass to one side or the other of mean point 101 by adjusting the member 95 on bracket 97 about the cradle axis 22 to thereby change the phase relation between the withdraw and advance motion and the cradle rotation. This of course changes the effective pressure angle at the center of the tooth surface (in the plane of Fig. 11) and also the center of the longitudinal tooth curvature, along line 111, and thus affords a means, which may be used either alone or in conjunction with other machine adjustments, to obtain desired modifications of the shape and position of the tooth bearing or contact area.

If the opposite tooth modification is wanted, i. e., if it is desired to remove less stock at opposite sides of line 102 than with normal generation, so that the tooth profiles will be less curved than those shown in broken lines in Fig. 11, the member 95 may be adjusted on bracket 97 to move the center 99 of roller 92 from the position shown in Fig. 3 to the position there shown at 99a. With such adjustment the cutter will advance along the cradle axis as the tooth surface generation proceeds to its mid-point and then will withdraw as the generation continues beyond said point.

It will be noted from Fig. 4 that the angle 99"—26—99 is somewhat smaller than the angle 99'—26—99. Accordingly the modification effected at opposite sides of line 102 in Fig. 10 will be asymmetrical, more stock will be removed from the tooth at one side of line 102 than at the other side, at one end of the tooth more than at the opposite end. This effect is compensated for when both members of a pair of gears are cut with the same amount of withdraw and advance motion, since then, due to the opposite hand of tooth spiral, the asymmetry is reversed on the two members, the lesser amount of stock being removed from the toe of the tooth surface of one member and from the heel of the mating tooth surface. However, it may be desired to allow a certain amount or all of the asymmetry to remain uncompensated for, and in this case one member of the pair may be cut either entirely without the relative withdraw and advance motion, or with a smaller amount of such motion than is employed in cutting the mating member.

It will be understood that the foregoing disclosure is made by way of illustration and example of the inventive principles involved and not by way of limitation, and that various changes may be made in the embodiments of these principles without departing from the spirit of the invention or from the scope of the appended claims.

I claim as my invention:

1. A machine for generating tapered gears comprising a spindle for a rotary cutter, a work spindle, a cradle on which one spindle is mounted, means for rotating the cutter spindle, drive means for rotating the cradle and in time therewith rotating the work spindle to cause the rotating cutter to effect tooth profile generation, and means for oscillating one spindle relative to the other, in a direction depthwise of the teeth being cut, the last-mentioned means being connected to the drive means to operate in such timed relationship therewith that during gear tooth generation a relative depthwise motion in one direction is effected between the cutter and the work as the generation proceeds approximately to its mid-point and that a relative depthwise motion in the opposite direction is effected as the generation proceeds beyond said point.

2. A machine according to claim 1 in which the motion in said one direction is a relative withdrawal and the motion in said opposite direction is a relative advance.

3. A machine according to claim 1 in which there is a rotary cutter having opposite side cutting surfaces which are oppositely inclined in the plane of the cutter axis, and in which the oscillation of one spindle relative to the other is in a direction such that both side cutting surfaces remove more stock when the cutter is advanced relatively to the work.

4. A machine according to claim 1 in which a means is provided to vary the phase relationship between said drive means and the means for oscillating one spindle relative to the other, to thereby vary the phase of tooth surface generation at which the reversal point of oscillation occurs.

5. A machine according to claim 1 in which there is a means to adjust the amplitude of the oscillation of one spindle relative to the other.

6. A machine according to claim 1 in which the oscillation of one spindle relative to the other is in a direction axial of the cradle.

7. A machine according to claim 1 in which the means for oscillating one spindle relative to the other comprises bearing means mounting the cutter spindle in the cradle for rotation and axial motion, a helical cam member and a cam follower member mounted on the cradle for motion relative to each other about an axis parallel to the cradle axis, one member being held against axial motion relative to the cradle and the other member against axial motion relative to the spindle, and a means for oscillating one member relative to the other member about their axis as the cradle turns.

8. A machine according to claim 7 in which the axis of relative motion of the helical cam member and cam follower member is coincident with the cutter spindle.

9. A machine according to claim 7 in which said means for oscillating one member comprises an arm on the latter having a slot extending radially of the axis of said members, and a roller engaged in said slot and supported by a stationary portion of the machine.

10. A machine according to claim 9 in which the roller is adjustable on said stationary portion of the machine in a direction radial of the cradle axis, to thereby vary the amplitude of oscillation of said one member, and is also adjustable on said stationary portion angularly about the cradle axis to vary the phase of tooth surface generation at which the reversal point of the oscillation occurs.

11. A machine according to claim 1 in which the cutter is a hob and the means for rotating the cutter spindle is connected with said drive means for rotation in time with rotation of the cradle and the work spindle.

12. The method of generating a tapered gear with a rotating cutter, by relative motions of work and the cutter respectively about the axis of the work and about the axis of an imaginary gear represented by the cutter, comprising moving the cutter relative to the work in one direction depthwise of the teeth being cut as the tooth surface generation effected by said relative motions about said axes proceeds toward approximately its mid-point and then moving the cutter relative to the work in the opposite direction as the generation continues beyond said point.

13. The method according to claim 12 in which the movements in said one direction and in said opposite direction are respectively a withdrawal and an advance of the cutter relative to the work.

14. The method according to claim 13 in which the relative withdrawal and advance are in the direction of the axis of said imaginary gear.

15. The method according to claim 13 in which the cutter axis is at least approximately parallel to the axis of the imaginary gear and the relative withdrawal and advance are in the direction of the cutter axis.

16. A machine according to claim 1 in which the means for oscillating said one spindle relative to the other comprises an arm mounted on the cradle for motion about an axis parallel to the cradle axis, the arm having a slot extending radially of its pivot axis, a roller engaged in said slot and supported by a stationary portion of the machine for oscillating the arm relative to the cradle as the latter turns during tooth surface generation, and means operable by and upon such angular oscillation of the arm for effecting rectilinear oscillation, in at least approximately the direction of the cradle axis, of the spindle mounted on the cradle.

17. A machine according to claim 16 in which the roller is adjustable on said stationary portion of the machine in a direction radial of the cradle axis, to thereby vary the amplitude of oscillation of said arm member, and is also adjustable on said stationary portion angularly about the cradle axis to vary the phase of tooth surface generation at which the reversal point of the oscillation occurs.

18. A machine for generating tapered gears comprising a support member mounting a tool for cutting motion, a work spindle member, a cradle on which one of said members is mounted, drive means for rotating the cradle and in time therewith rotating the work spindle member, to thereby effect tooth profile generation, and means for producing a relative oscillating motion of said members in a direction depthwise of the teeth being cut, the last-mentioned means being connected to the drive means to operate in such timed relationship therewith that during gear tooth generation a relative depthwise motion in one direction is effected between the tool and the work as the generation proceeds approximately to its midpoint and that relative depthwise motion in the opposite direction is effected as the generation proceeds beyond said point.

19. The method of generating a tapered gear with a moving cutting tool, by relative motions of the work and tool respectively about the axis of the work and about the axis of an imaginary gear represented by the tool, comprising moving the tool relative to the work in one direction depthwise of the teeth being cut as the tooth surface generation effected by said relative motions about said axes proceeds toward approximately its mid-point and then moving the tool relative to the work in the opposite direction as the generation continues beyond said point.

References Cited in the file of this patent

UNITED STATES PATENTS

| | | |
|---|---|---|
| 1,964,800 | Hill | July 3, 1934 |
| 2,171,406 | Schict | Aug. 29, 1939 |
| 2,302,004 | Carlsen | Nov. 17, 1942 |
| 2,315,068 | Matthews | Mar. 30, 1943 |
| 2,376,465 | Wildhaber | May 22, 1945 |
| 2,385,331 | Carlsen | Sept. 25, 1945 |
| 2,392,819 | Gruenberg et al. | Jan. 15, 1946 |
| 2,567,273 | Carlsen | Sept. 11, 1951 |